United States Patent
Zuliani et al.

(10) Patent No.: US 9,686,539 B1
(45) Date of Patent: Jun. 20, 2017

(54) CAMERA PAIR CALIBRATION USING NON-STANDARD CALIBRATION OBJECTS

(71) Applicant: Apple Inc., Cupertino, CA (US)

(72) Inventors: Marco Zuliani, Los Gatos, CA (US); Claus Molgaard, Los Gatos, CA (US); Paul M. Hubel, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/180,048

(22) Filed: Jun. 12, 2016

(51) Int. Cl.
| | |
|---|---|
| H04N 17/00 | (2006.01) |
| H04N 17/02 | (2006.01) |
| H04N 5/247 | (2006.01) |
| G06T 7/00 | (2017.01) |

(52) U.S. Cl.
CPC ........... *H04N 17/002* (2013.01); *G06T 7/004* (2013.01); *H04N 5/247* (2013.01); *G06T 2207/30168* (2013.01)

(58) Field of Classification Search
CPC ...... H04N 17/00; H04N 17/02; H04N 17/002; H04N 9/74; H04N 5/23216; H04N 5/232; H04N 5/247; G06T 7/004; G06T 2207/30168
USPC .................................. 348/187, 180, 188, 47
See application file for complete search history.

(56) References Cited

U.S. PATENT DOCUMENTS

| | | | | |
|---|---|---|---|---|
| 6,064,749 | A * | 5/2000 | Hirota ..................... | G06F 3/011 345/7 |
| 7,508,979 | B2 * | 3/2009 | Comaniciu ........ | G06K 9/00248 382/103 |
| 7,760,242 | B2 * | 7/2010 | Anabuki ............... | G06F 3/0325 348/208.14 |
| 8,073,201 | B2 * | 12/2011 | Satoh ..................... | G01B 21/04 382/106 |
| 8,126,261 | B2 | 2/2012 | Medioni et al. | |
| 8,339,459 | B2 | 12/2012 | Zhang et al. | |
| 8,917,317 | B1 * | 12/2014 | Beeler ................ | G01B 11/2504 348/47 |
| 9,165,365 | B2 | 10/2015 | Hara et al. | |
| 9,508,147 | B2 * | 11/2016 | Endo ..................... | G06T 19/006 |
| 2014/0168378 | A1 | 6/2014 | Hall | |

FOREIGN PATENT DOCUMENTS

EP 2309451 4/2011

\* cited by examiner

*Primary Examiner* — Trang U Tran
(74) *Attorney, Agent, or Firm* — Blank Rome LLP

(57) ABSTRACT

Systems, methods, and computer readable media for calibrating two cameras (image capture units) using a non-standard, and initially unknown, calibration object are described. More particularly, an iterative approach to determine the structure and pose of an target object in an unconstrained environment are disclosed. The target object may be any of a number of predetermined objects such as a specific three dimensional (3D) shape, a specific type of animal (e.g., dogs), or the face of an arbitrary human. Virtually any object whose structure may be expressed in terms of a relatively low dimensional parametrized model may be used as a target object. The identified object (i.e., its pose and shape) may be used as input to a bundle adjustment operation resulting in camera calibration.

19 Claims, 4 Drawing Sheets

CAMERA PAIR CALIBRATION USING NON-STANDARD CALIBRATION OBJECTS

BACKGROUND

This disclosure relates generally to digital photography. More particularly, but not by way of limitation, this disclosure relates to a technique for calibrating a pair of image capture devices using a face or other standard object as a calibration standard. As used herein, the term "camera" means any device that has at least two image capture units, each capable of capturing an image of a scene at substantially the same time (e.g., concurrently). This definition explicitly includes stand-alone digital cameras and image capture systems embedded in other devices such as mobile telephones, portable computer systems including tablet computer systems, and personal entertainment devices.

Two cameras may be used to generate stereoscopic images, depth maps and disparity maps. Two-camera systems may also be used to improve or assist image registration and fusion operations. To accomplish this however, the cameras need to be calibrated to one another. That is, the pose of the first camera with respect to the second camera needs to be known. Referring to FIG. 1, illustrative system 100 includes camera 105 having first and second image capture units 110 and 115. Image capture unit 110 has field of view (FOV) 120 and image capture unit 115 has FOV 125. When accurate machining and motion control is available, planar calibration target 130 or camera 105 may be moved in a controlled manner. During such motion, initial estimates for each capture unit's pose may be obtained and used in combination with calibration target 130's known structure/geometry and each image capture unit's known intrinsic parameters (e.g., focal lengths, skew, and optical center) to calibrate the two image capture devices. Key to this process is precise knowledge of the calibration object's structure or geometry. Once device 105 enters the consumer market, the availability of known calibration objects is lost. Further, the calibration of such units may change over time as they are subject to, for example, ballistic motions (e.g., being dropped) and thermal stresses. A loss of calibration can, in turn, reduce the quality of the three dimensional information available from such systems thereby negatively impacting operations relying on that information.

SUMMARY

In one embodiment the disclosed concepts provide a method to calibrate two image capture units or cameras based on a non-standard, and initially unknown, calibration object. The method includes obtaining a first image of an object (e.g., a human face) from a first image capture unit and, concurrently, a second image of the object from a second image capture unit; identifying a first and second sets of landmark points based on the first and second images respectively; determining first and second poses based on the first and second sets of landmark points respectively (e.g., using a POSIT and, possibly, an initial structure of the object such as, for example, an "average" face); determining a first estimated structure of the object based on the first and second poses; determining a first projection error based on the first pose, the second pose and the first estimated structure; calibrating, when the first projection error is less than a first threshold value, the first and second image capture units based on the first estimated structure; and determining, when the first projection error is more than a second threshold value: (•) revised first and second poses based on the first and second sets of landmark points and the first estimated structure, (•) a second estimated structure based on the revised first and second poses and the first estimated structure, and (•) a new first projection error based on the revised first and second poses and the second estimated structure.

In one embodiment the two image capture units may be incorporated in a single electronic device. In some embodiments, the first and second threshold values may be the same while in other embodiments they may be different. In still other embodiments, determining a revised first pose, a revised second pose, a second estimated structure, and a new first projection error may be repeated until the new first projection error is less than the first threshold value. The disclosed methods may be embodied in computer executable programs or instructions. Such computer programs or instructions may be stored in any media that is readable and executable by a computer system.

DETAILED DESCRIPTION

Figure 1:
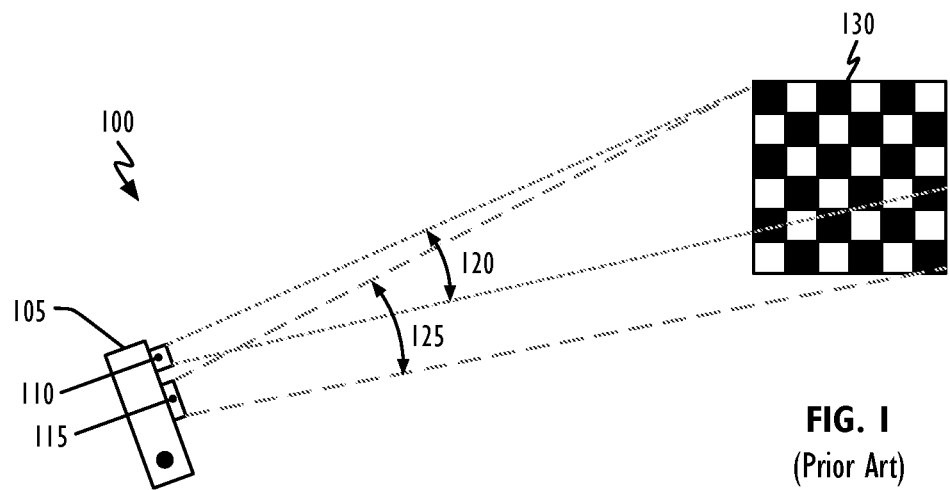
FIG. 1 illustrates a calibration arrangement for a camera system in accordance with the prior art.

This disclosure pertains to systems, methods, and computer readable media to improve the operation of digital cameras having two or more image capture units. Techniques are disclosed for calibrating two cameras (image capture units) using a non-standard, and initially unknown, target (calibration) object. The target object may be any of a number of object types such as a specific three dimensional (3D) shape, a specific type of animal (e.g., dogs) or, in one particular embodiment, a human face. In general, any object type that may be expressed with a reasonably low-dimensional (possibly linear) parametrized model may be used as the target object. One result of the disclosed operation is a refined characterization of the target object's structure. This structure, along with the cameras' intrinsics and extrinsics, may be used as input to a non-linear bundle adjustment operation resulting in camera calibration. One of ordinary skill in the art will understand that for a bundle adjuster to converge a good initial estimate of the calibration rig's structure must be known. In the prior art this would be the planar calibration target 130. In accordance with this disclosure this could now be any target object, images of which may be captured in an unconstrained environment, characterized by a parametrized model that is, through an iterative approach, refined to the desired level of accuracy. While the disclosed subject matter is not so limited, this disclosure will focus on the iterative refinement of a model directed to a single human face captured by a pair of cameras.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and use of image capture systems having the benefit of this disclosure.

As noted above, camera calibration usually requires a reference object (e.g., a rigid 3D checkerboard pattern) that must be seen from both cameras and from multiple positions. Because of these requirements, camera calibration is usually only performed at time of manufacture or during special "calibration sessions" when the camera may be placed into—and moved through—a controlled environment (see FIG. 1). The issue of post-sale calibration of multi-camera devices may become significant as the number of such devices entering the consumer market continues to increase. When this happens, the ability to accurately generate and/or use 3D information available from such devices may depend, in part, on the accuracy of their calibration—where such calibration may change over time as the devices are subject to, for example, thermal stresses and ballistic motions.

To simplify the presentation of a specific embodiment, the following assumptions and notations are herein adopted.

Camera calibration matrix K may be given by:

$$K = \begin{bmatrix} f_x & \gamma & u_x \\ 0 & f_y & u_y \\ 0 & 0 & 1 \end{bmatrix}, \qquad \text{EQ. 1}$$

where $f_x$ and $f_y$ represent a camera's focal length, $\gamma$ represents the axis skew, and $u_x$ and $u_y$ represent the principal point offset. For the sake of simplicity, it is assumed that $f_x = f_y$, and $\gamma = 0$.

There exists a landmark detector that, given an image of an object of a specified type (e.g., a face or a particular type of animal), is able to localize a set of n representative points of the object itself (e.g., facial landmarks): $x_1, x_2, \ldots, x_n \in \mathbb{R}^2$. Here, $x_i$ represents the coordinate points (in the image sensor's plane) of the i-th landmark.

The set of landmark points $X_1, X_2, \ldots, X_n \in \mathbb{R}^3$. These point coordinates may be stacked on top of one another to form a shape vector, L:

$$L = \begin{bmatrix} X_1 \\ \vdots \\ X_n \end{bmatrix} \in \mathbb{R}^{3n}. \qquad \text{EQ. 2}$$

By way of example, if $L = [X_1, X_2, \ldots, X_n]^T$ then $X_i$ represents the 3D coordinates of the target object's i-th landmark point with respect to the object coordinate system.

All possible configurations of a 3D object's landmarks can be expressed as a linear combination of a set of p basis vectors forming the columns of a matrix $S \in \mathbb{R}^{3n \times p}$ plus a mean shape $\mu \in \mathbb{R}^{3n}$ so that, given p<n, S may be defined as:

$$\forall L \exists \phi s \cdot t \cdot L \approx S\phi + \mu \qquad \text{EQ. 3}$$

holds true. Here, S and $\mu$ can be estimated in many different ways. When the target object is a face, S and $\mu$ define the affine space of face shapes. For purposes of the following discussion, and not by way of limitation, it will be assumed that S and $\mu$ are constructed from a set of shape vectors from different persons with different expressions via principal component analysis (PCA). When this is so, $\phi \in \mathbb{R}^p$ encodes the structure of the face (target object). To be clear, S and $\mu$ may represent any specified target object that can be modeled as described here.

Let projection matrix $P_i \in \mathbb{R}^{3 \times 3n}$ be such that $P_i L = X_i$. That is, $P_i$ acts as a row selector that extracts the coordinates of the i-th element from shape vector L.

A point in the world coordinate system may be projected onto the camera image plane (e.g., the plane of the digital image sensor) according to the following relation:

$$x = \Pi(K(RX + T)), \qquad \text{EQ. 4}$$

where $R \in \mathbb{R}^3$ is a rotation matrix and $T \in \mathbb{R}^3$ is a translation vector. (R and T are but one of a number of possible parameterizations of a camera's intrinsic parameters.) The projection operator $\Pi$ is such that:

$$\prod(x) = \begin{bmatrix} \dfrac{x_1}{x_3} & \dfrac{x_2}{x_3} \end{bmatrix}^T, \qquad \text{EQ. 5}$$

where $x_1$, $x_2$ and $x_3$ represent the 3D coordinates of the point X.

Single View Face Reconstruction and Pose Estimation.

To begin, assume a single image capture device with a known focal length and whose principal point coincides with a captured image's center. Knitting together two observations allows one to estimate, from a single image, the 3D landmark coordinates (e.g., the facial structure) as well as the face pose (i.e. the camera extrinsic parameters): [1] If the 3D coordinates of the landmark points are known (and their projections onto the camera image plane), it is possible to estimate the camera pose; and [2] If the camera pose is known, it is possible to estimate the 3D landmark coordinates. These two ideas can be combined in an iterative fashion, the convergence of which, may be achieved when the projection of the estimated face shape onto the camera image plane via the estimated intrinsic and extrinsic parameters is close enough to the position of the detected facial landmarks. Analytically, this difference or residual may be determined as:

$$J(x_1, \ldots, x_n, \hat{R}, \hat{T}, \hat{\phi}) = \Sigma_{i=1}^{n} \|x_i - \Pi[K(\hat{R}P_i(S\hat{\phi}+\mu)+\hat{T})]\| \quad \text{EQ. 6}$$

where the "hat" symbol (^) indicates an estimated value.

Figure 2:
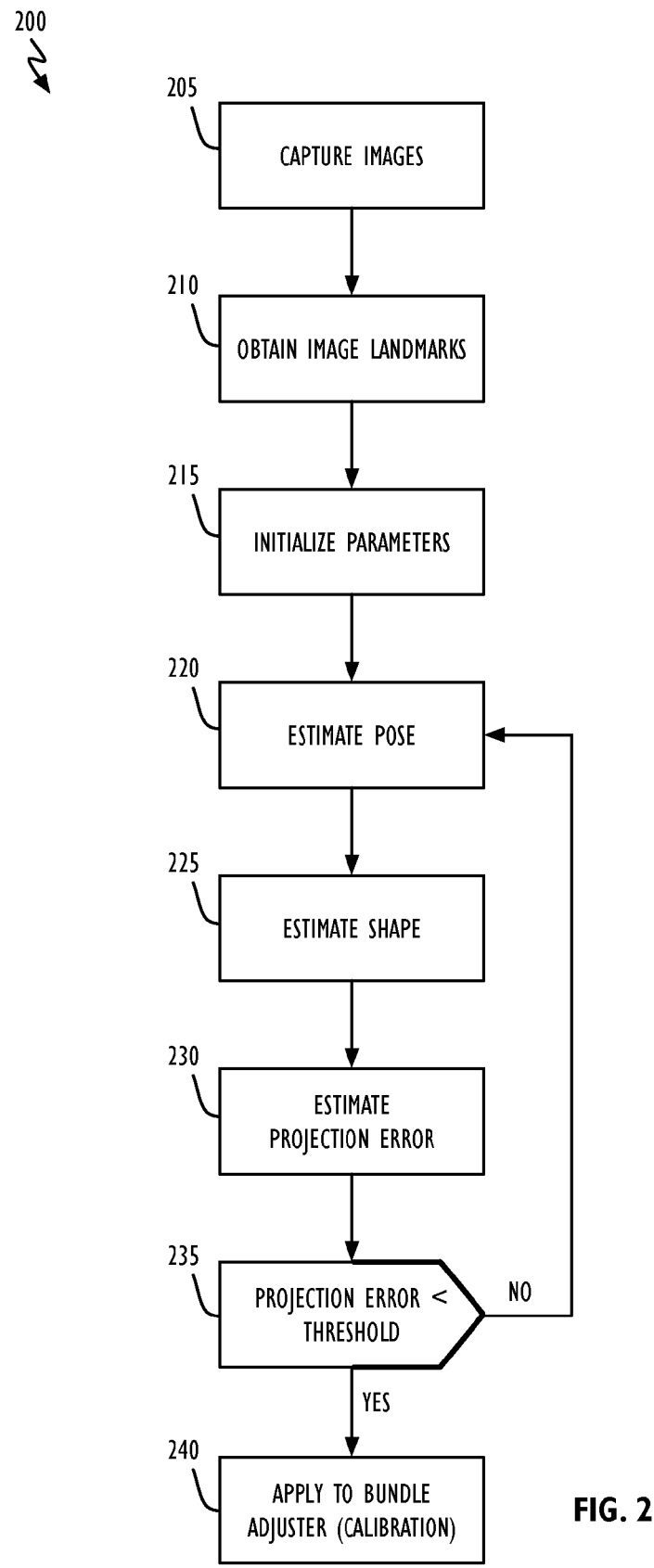
FIG. 2 shows, in flowchart form, face structure and pose estimation operation in accordance with one embodiment.

Referring to FIG. 2, camera calibration operation 200 in accordance with one embodiment first captures images of a target object using, for example, two image capture units or cameras (block 205). Coordinates $x_1, \ldots, x_n$ of the captured image's facial landmarks (represented as points in the image sensor's plane) may be determined (block 210) and the affine space of face shapes S and $\mu$, the camera's calibration matrix K, and a convergence threshold $T_j$ indicating when the estimated facial structure and pose are "good enough" obtained (block 215). These latter quantities may be determined during a prior offline training phase. Also during initialization, a residual value J may be taken to be some large value and the face vector estimate $\hat{L}$ may be set equal to the average face shape $\mu$ (e.g., see Table 1 below). By first assuming that the target face's structure $\phi$ is known in accordance with item [1] above, the face's pose ($\hat{R}$, $\hat{T}$) may be estimated using any one of a number of known pose estimation procedures (block 220). One illustrative procedure to determine the imaged face's pose is POSIT. Assume now, in accordance with item [2] above, both the camera extrinsic parameters ($\hat{R},\hat{T}$) and the affine space of face shapes (S, $\mu$) are known. The position of the face landmarks in 3D space and onto the camera image (sensor) plane may be constrained by the following:

$$x = \Pi[K(RX+T)]\Pi[K(RP(S\phi+\mu)+T], \quad \text{EQ. 7}$$

where P is the projection matrix that extracts the proper portion of the shape vector corresponding to the point x. Rearranging EQ. 7 yields:

$$x \approx \Pi[(KRPS)\phi + K(RP\mu+T)] = \Pi[A\phi + b]. \quad \text{EQ. 8}$$

Expanding the projection operation $\Pi$ yields:

$$\begin{cases} x(a_3\phi + b_3) \approx a_1\phi + b_1 \\ y(a_3\phi + b_3) \approx a_2\phi + b_2 \end{cases} \Rightarrow \begin{cases} (xa_3 - a_1)\phi \approx b_1 - xb_3 \\ (ya_3 - a_2)\phi \approx b_2 - yb_3 \end{cases}, \quad \text{EQ. 9}$$

where $a_1$, $a_2$ and $a_3$ are the rows of the matrix $A \Sigma \mathbb{R}^{3 \times 3}$. By repeating the process for each of the facial landmarks and stacking the resulting equations one on top of the other an over-determined linear system may be obtained:

$$H(R)\phi \approx z(R,T), \quad \text{EQ. 10}$$

where $H \Sigma \mathbb{R}^{2n \times p}$ and $z \Sigma \mathbb{R}^{2n}$ and the arguments within the parentheses explicitly show the dependence from the camera extrinsics. As long as $2n > p$, the value of $\phi$ (which encodes the imaged face's structure or shape) can be determined in a "least square sense" (block 225). In one embodiment, $\phi$ may be determined (in a least-squared sense) using the Matlab® programming environment as illustrated in Table 1. (MATLAB is a registered trademark of The MathWorks, Inc.)

TABLE 1

Single Image Shape Estimation Operation

```
function phi = estimate_shape_projective (x, y, S, mu, R, T, K,
options)
    nl = size(S, 1)/3;
    np = size(S, 2);
    C = K*R;
    D = K*T;
    H = zeros(2*nl, np);
    z = zeros(2*nl, 1);
    r2 = 1:2;
```

TABLE 1-continued

Single Image Shape Estimation Operation

```
    r3_dst = 1:3;
    r3_src = 1:3;
    for n = 1:nl
        A = C*S (r3_src, :) ;
        b = C*mu (r3_src) + D;
        H (r2 (1) , :) = A(3, :) * x(n) - A(1, :);
        H(r2 (2) , :) = A(3, :) * y(n) - A(2, :);
        z (r2 (1)) = b(1) - b(3) * x(n) ;
        z (r2 (2)) = b(2) - b(3) * y (n);
        r2 = r2 + 2;
        r3_dst = r3_dst + 3;
        r3_src = r3_src + 3;
    end;
    phi = H\z;
return
```

The residual, given by EQ. 6 may now be determined (block 230) and compared against a specified threshold (block 235). As noted above, this threshold ($T_j$) may be established a priori. In another embodiment, however, this threshold may be determined dynamically. By way of example, this threshold may be met if the change in the projection error determined in accordance with block does not change over a given number of iterations more than a given amount. If the determined error (aka residual) is less than a specified threshold (the "YES" prong of block 235), the target object's (e.g., face's) pose and structure may be passed to a non-linear bundle adjuster to complete the cameras' calibration (block 240). If the residual is not less than the specified threshold (the "NO" prong of block 235), another iteration of operation 200 may begin at block 220. In one embodiment, a first threshold may be used to determine the projection error meets the YES prong of block 235 and a second threshold used to determine the projection error meets the NO prong of block 235. This permits, for example, a large distinction between the YES and NO actions of block 2325. In another embodiment the same threshold value may be used. In still another embodiment, The YES prong of block 235 may need to be met a specified minimum number of consecutive evaluations. The presentation here, based on a single image, can provide initial values for a face's pose and structure that, in combination with non-linear optimization techniques (e.g., bundle adjuster), may be used to determine a final pose and face structure.

Camera Pair Calibration from Face Images.

Figure 3:
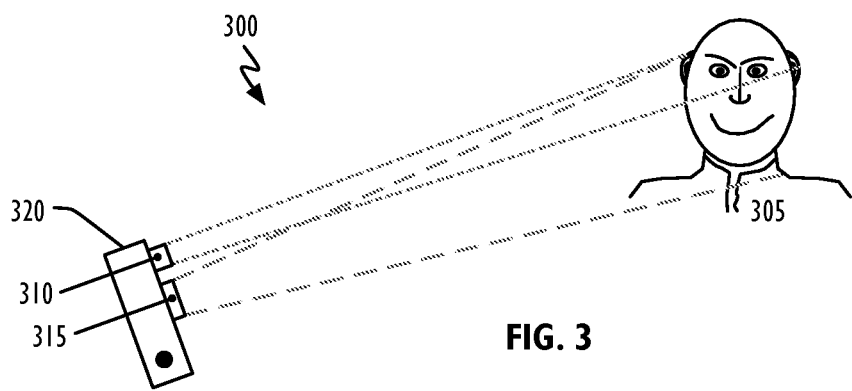
FIG. 3 shows, in block diagram form, a two camera system in accordance with one embodiment.

Referring to FIG. 3, given image capture system 300, face 305 seen from two cameras or digital image capture units (310 and 315 of electronic device 320), the bundle adjustment can be defined as the problem of simultaneously refining the 3D coordinates of the face's facial landmarks as well as the parameters of the relative motion between the cameras (the camera extrinsics) and possibly the optical characteristics of the cameras employed to acquire the images (the camera intrinsics), according to an optimality criterion involving the corresponding image projections of all the facial landmarks which can be expressed as:

$$K^1, R^1, T^1, K^2, R^2, T^2, \phi = \text{argmin} \Sigma_{i=1}^{2} J(x_1^i, \ldots, x_n^i, R^i, T^i, \phi). \quad \text{EQ. 11}$$

When EQ. 11 is satisfied, the camera pair may be said to be calibrated.

Bundle adjustment amounts to jointly refining the set of initial camera parameters and landmark positions for finding the set of parameters that most accurately predict the locations of the observed landmarks in the two image planes. (It is assumed that both cameras 310 and 315 can see all of the target object's landmark points (e.g., face 305). In another embodiment, this constraint may be relaxed, especially when more than two cameras are used. In this section, the methods of the prior section are tailored and extended to provide a good initialization to the bundle adjuster that minimizes EQ. 11.

Once the quantities in EQ. 11 have been estimated, the transformation between the camera coordinate systems such that $X^2 = \bar{R}X^1 + \bar{T}$ may be estimated. To find $\bar{R}$ and $\bar{T}$, the following relations may be applied:

$$\begin{cases} \bar{R} = (R^2)(R^1)^T \\ \bar{T} = T^2 - (R^2)(R^1)^T(T^1) \end{cases} \quad \text{EQ. 12}$$

where $\bar{R}$ represents the rotation of camera-1 with respect to camera-2 and $\bar{T}$ represents the translation of camera-1 with respect to camera-2. By determining $\bar{R}$ and $\bar{T}$, the goal of calibrating the camera pair is achieved.

When only a single image of a face is captured by the two or more image capture units (or, more precisely, when a set of corresponding landmarks is detected), estimation of the camera extrinsics remains decoupled and therefore the POSIT operation may be used for each of the two cameras. This will return an initial estimate for $R^1$, $T^1$, and $R^2$, $T^2$. If multiple faces are captured, the intrinsic parameters may be constrained by the poses of the image capture units with respect to one another, and therefore it would make sense to resort to an approach that explicitly takes advantage of this constraint.

In the single face case, because the same face is seen by both of the cameras, the structure parameter PHI is shared across both views. Hence, the coupling may be expressed by modifying EQ. 10 so that:

$$\begin{bmatrix} H(R^1) \\ H(R^2) \end{bmatrix} \phi = \begin{bmatrix} z(R^1, T^1) \\ z(R^2, T^2) \end{bmatrix}. \quad \text{EQ. 13}$$

By using EQ. 13 (instead of EQ. 10) during acts in accordance with block 225 calibration operation 200 may be used to calibrate two cameras based on images captured "in the wild" (e.g., in a post-sale environment) using a human face (or other target object that has a model as discussed above) of any arbitrary individual with any arbitrary expression and without any special calibration rig.

Figure 4:
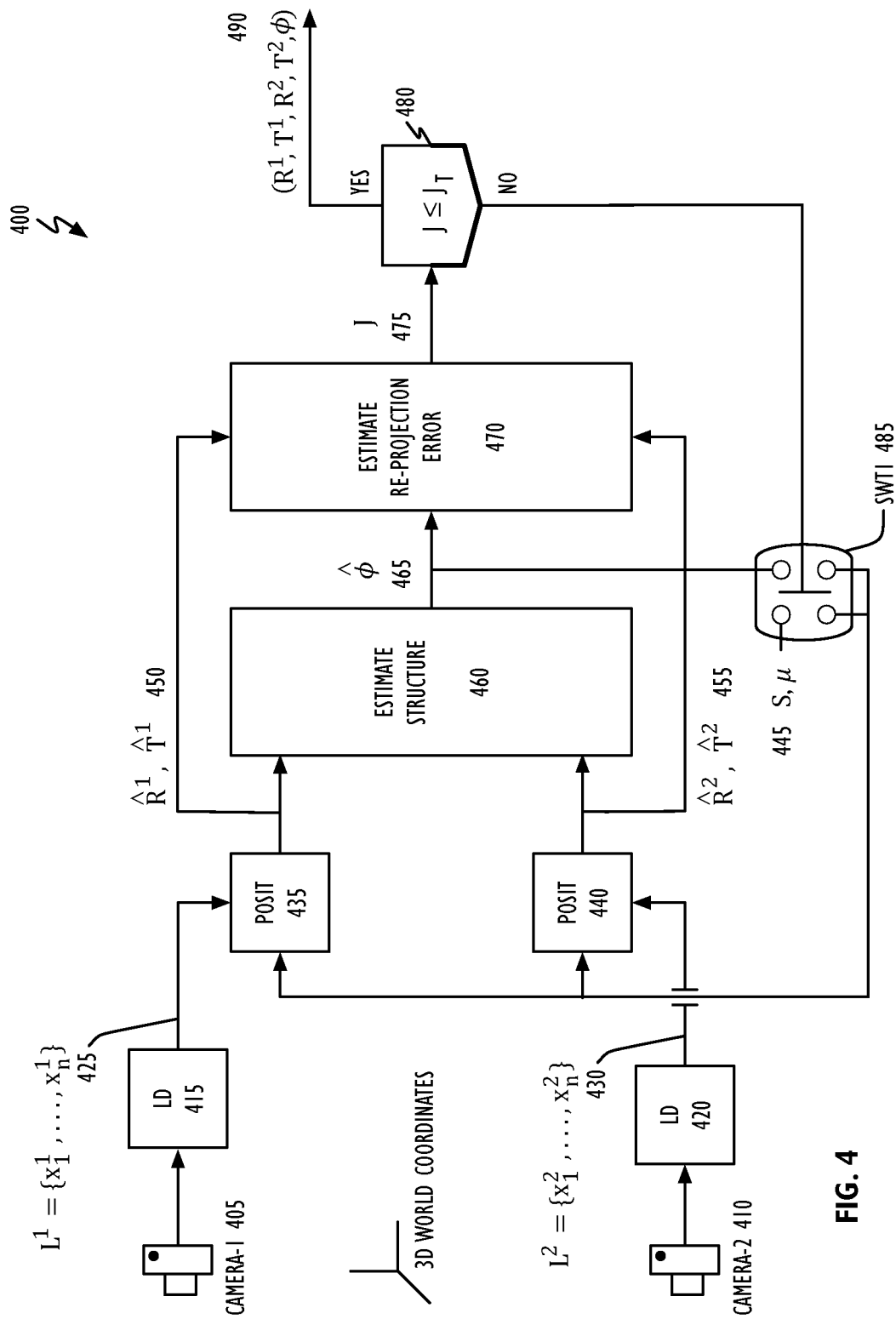
FIG. 4 shows a two-camera system in accordance with one embodiment.

Referring to FIG. 4, two-camera system 400 in accordance with one embodiment includes camera-1 405 and camera-2 410 in fixed spatial relationship to one another (in an environment that may be characterized using a 3D world coordinate system). After capturing an image of the same subject at substantially the same time, each camera's image may be submitted to a landmark detection module or circuit 415 and 420 respectively. One result of landmark detection 415 and 420 is a shape vector: $L^1$ 425 representing a target object's initial structure (e.g., a face) as captured by camera-1 405; and $L^2$ 430 representing the target object's initial structure as captured by camera-2 410. (As noted above, it is assumed that both cameras 405 and 410 can see all of the target object's landmark points.

Initial shape vectors $L^1$ and $L^2$ may be applied to three-dimensional (3D) pose estimation (POSIT) modules or circuits 435 and 440 respectively. As shown, POSIT operations 435 and 440 may also each receive input that characterizes or models the target object. In the illustrative embodiment shown in FIG. 4, this is the affine space of face shapes, $(S, \mu)$ 445 or estimated shape 465 (discussed below). POSIT modules or circuits 435 and 440 may generate initial pose descriptor estimates $(\widehat{R^1}, \widehat{T^1})$ 450 and $(\widehat{R^2}, \widehat{T^2})$ 455, where $\widehat{R^1}$ is a rotation matrix that represents an estimate of the rotation of camera-1 405 with respect to camera-2 410, $\widehat{T^1}$ is a translation matrix that represents an estimate of the translation of camera-1 405 with respect to camera-2 410, $\widehat{R^2}$ is a rotation matrix that represents an estimate of the rotation of camera-2 410 with respect to camera-1 405, and $\widehat{T^2}$ is a translation matrix that represents an estimate of the translation of camera-2 410 with respect to camera-1 405.

Given initial poses $(\widehat{R^1}, \widehat{T^1})$ 450 and $(\widehat{R^2}, \widehat{T^2})$ 455 structure estimation module or circuit 460 may generate an estimate face structure $\hat{\phi}$ 465 (e.g., in accordance with EQ. 13). Based on initial pose estimates $(\widehat{R^1}, \widehat{T^1})$ 450 and $(\widehat{R^2}, \widehat{T^2})$ 455 and initial shape estimate $\hat{\phi}$ 465, re-projection error estimate module or circuit 470 may be used to determine the current error or residual J 475. If the determined residual J 475 is greater than a specified threshold $J_T$ (the "NO" prong of block 480), switch-1 485 is operated so that shape estimate 465 is fed back to pose modules/circuits 435 and 440, where after system 400 continue with another iteration. As illustrated, if switch 485 is not in a position to route shape estimate $\hat{\phi}$ 465 to POSIT circuits 435 and 440, S and $\mu$ 1425 values may be routed thereto. Such would be the case, for example, when operation 400 is first begun. That is, POSIT operations 435 and 440 may be initialized by the affine space of face shapes $(S,\mu)$ 445. If, on the other hand, the determined residual J 475 is less than or equal to specified threshold $J_T$ (the "YES" prong of block 480), pose and shape information 490 may be used to initialize a bundle adjustment operation, the result of which is calibration of the two cameras.

Figure 5:
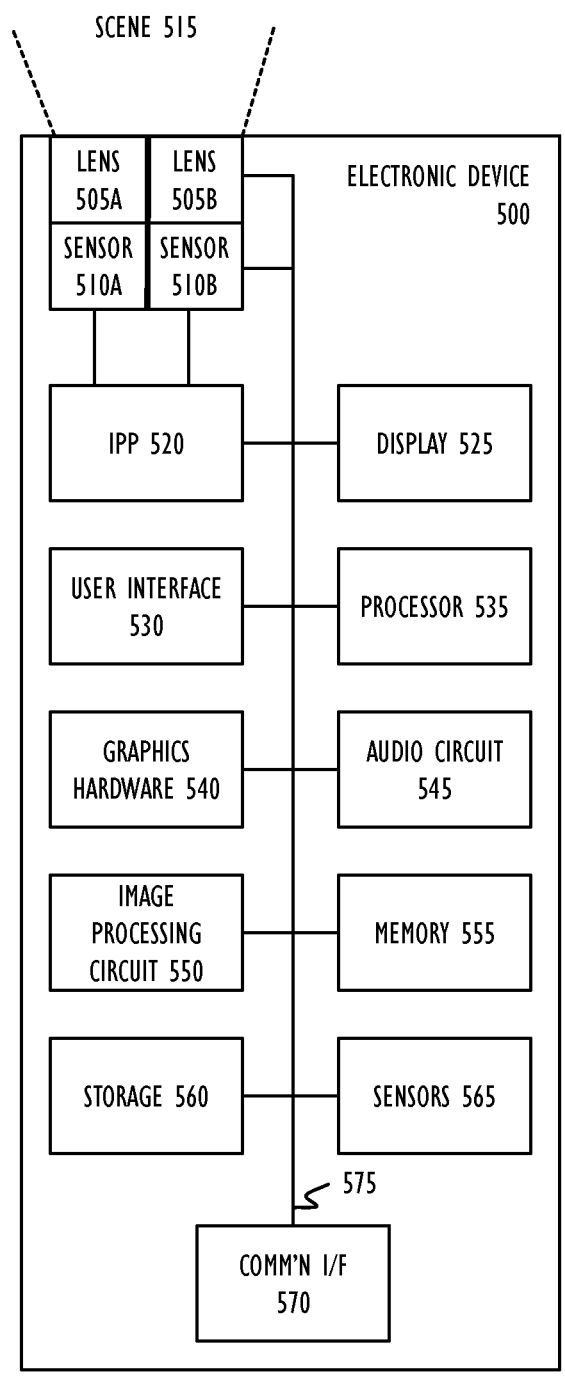
FIG. 5 shows, in block diagram form, a multi-function electronic device in accordance with one embodiment.

Referring to FIG. 5, a simplified functional block diagram of illustrative electronic device 500 in accordance with one embodiment is shown. Electronic device 500 may be used to acquire, generate or display images in accordance with this disclosure (e.g., see FIGS. 3-4). Electronic device 500 could be, for example, a mobile telephone, personal media device, a notebook computer system, or a tablet computer system. As shown, electronic device 500 may include first and second lens assemblies 505A and 505B and corresponding image sensors 510A and 510B for capturing images of scene 515 having one or more target objects (e.g., faces). In addition, electronic device 500 may include image processing pipeline (IPP) 520, display element 525, user interface 530, processor(s) 535, graphics hardware 540, audio circuit 545, image processing circuit 550, memory 555, storage 560, sensors 565, communication interface 570, and communication link 575.

Lens assemblies 505A and 505B may each include a single lens or multiple lens, filters, and a physical housing unit (e.g., a barrel). One function of a lens assembly is to focus light from scene 515 onto the corresponding image sensor. Image sensors 510A and 510B may, for example, be CCD (charge-coupled device) or CMOS (complementary metal-oxide semiconductor) image sensors. In one embodiment, image sensors 510A and 510B may be physically distinct sensors. In another embodiment, image sensors 510A and 510B may be different portions of a single sensor element. In still another embodiment, image sensors 510A and 510B may be the same sensor element with the two images described above being captured in rapid succession through lens elements 505A and 505B. IPP 520 may perform a number of different tasks including, but not limited to, black level removal, de-noising, lens shading correction, white balance adjustment, demosaic operations, and the application of local or global tone curves or maps. IPP 520 may comprise a custom designed integrated circuit, a programmable gate-array, a central processing unit, a graphical processing unit, memory, or a combination of these elements (including more than one of any given element). Some functions provided by IPP 520 may be implemented at least in part via software (including firmware). Display element 525 may be used to display text and graphic output as well as receiving user input via user interface 530. For example, display element 525 may be a touch-sensitive display screen. User interface 530 can also take a variety of other forms such as a button, keypad, dial, a click wheel, and keyboard. Processor 535 may be a system-on-chip (SOC) such as those found in mobile devices and include one or more dedicated graphics processing units (GPUs). Processor 535 may be based on reduced instruction-set computer (RISC) or complex instruction-set computer (CISC) architectures or any other suitable architecture and may include one or more processing cores. Graphics hardware 540 may be special purpose computational hardware for processing graphics and/or assisting processor 535 perform computational tasks. In one embodiment, graphics hardware 540 may include one or more programmable GPUs each of which may have one or more cores. Audio circuit 545 may include one or more microphones, one or more speakers and one or more audio codecs. Image processing circuit 550 may aid in the capture of still and video images from image sensors 510A and 510B and include at least one video codec. Image processing circuit 550 may work in concert with IPP 520, processor 535 and/or graphics hardware 540. Images, once captured, may be stored in memory 555 and/or storage 560. Memory 555 may include one or more different types of media used by IPP 520, processor 535, graphics hardware 540, audio circuit 545, and image processing circuitry 550 to perform device functions. For example, memory 555 may include memory cache, read-only memory (ROM), and/or random access memory (RAM). Storage 560 may store media (e.g., audio, image and video files), computer program instructions or software, preference information, device profile information, and any other suitable data. Storage 560 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Device sensors 565 may include, for example, proximity sensor/ ambient light sensor, accelerometer and/or gyroscopes. Communication interface 570 may be used to connect device 500 to one or more networks. Illustrative networks include, but are not limited to, a local network such as a USB network, an organization's local area network, and a wide area network such as the Internet. Communication interface 570 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). Communication link 575 may be a continuous or discontinuous communication path and may be implemented, for example, as a bus, a switched interconnect, or a combination of these technologies.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, FIG. 2 shows a flowchart illustrating an iterative approach to calibrating two cameras using a target object in accordance with the disclosed embodiments. In one or more embodiments, one or more of the disclosed steps may be omitted, repeated, and/or performed in a different order than that described herein. Accordingly, the specific arrangement of steps or actions shown in FIG. 2 should not be construed as limiting the scope of the disclosed subject matter. As previously noted, the disclosed technology is not limited to the detection and use of human faces. The disclosed technology is equally applicable to the detection and use of any structure for which a model may be used to characterize the structure. Examples of such shapes include automobiles, animals such as dogs or cats, and other known shapes such as a can of soda. In addition, the two images used illustratively herein may be replaced with a sequence of images of an object captured at different distances (e.g., images captured by a rear-view camera as an automobile backs toward the object). The disclosed technology may also be used as part of a heads-up display or virtual reality or augmented reality device. Further, in an electronic device comprising two or more cameras the ability to move one such camera (digital image capture unit) with respect to another of the cameras may also be used to capture two or more images that the disclosed techniques may be applied to (e.g., see FIG. 2). The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method to calibrate cameras, comprising:
obtaining a first image of an object from a first image capture unit and, concurrently, a second image of the object from a second image capture unit;
identifying a first set of landmark points based on the first image and a second set of landmark points based on the second image;
determining a first pose of the object based on the first set of landmark points and a putative structure of the object and a second pose of the object based on the second set of landmark points and the putative structure of the object;
determining an estimated structure of the object based on a model of the object and the first and second poses;
determining a projection error based on the first pose, the second pose and the estimated structure of the object;
evaluating whether the projection error meets a threshold value;
calibrating the first and second image capture units based on the estimated structure when the projection error meets the threshold value; and
repeating each of the determining actions and the evaluating action when the projection error does not meet the threshold value, wherein the putative structure of the object is replaced by the estimated structure of the object.

2. The method of claim 1, wherein the object comprises a human face.

3. The method of claim 2, wherein the putative structure of the object comprises an affine space of face shapes.

4. The method of claim 1, wherein the first and second image capture units are in a single electronic device.

5. The method of claim 1, wherein determining a first pose comprises applying the first set of landmark points to a POSIT operation.

6. The method of claim 1, wherein calibrating comprises applying the estimated structure of the object to a bundle adjust operation to calibrate the first and second image capture units.

7. The method of claim 6 further comprising applying at least one of the first pose and second pose to the bundle adjust operation.

8. An electronic device, comprising:
a first image capture unit;
a second image capture unit;
a memory communicatively coupled to the first and second image capture units; and
one or more processors communicatively coupled to the first and second image capture units and the memory, the one or more processors configured to execute instructions stored in the memory to cause the electronic device to —
obtain a first image of an object from the first image capture unit and, concurrently, a second image of the object from the second image capture unit;
identify a first set of landmark points based on the first image and a second set of landmark points based on the second image;
determine a first pose of the object based on the first set of landmark points and a putative structure of the object and a second pose of the object based on the second set of landmark points and the putative structure of the object;
determine an estimated structure of the object based on a model of the object and the first and second poses;
determine a projection error based on the first pose, the second pose and the estimated structure of the object;
evaluate whether the projection error meets a threshold value;
calibrate the first and second image capture units based on the estimated structure when the projection error meets the threshold value; and
repeat each of the instructions to determine and the instructions to evaluate when the projection error does not meet the threshold value, wherein the putative structure of the object is replaced by the estimated structure of the object.

9. The electronic device of claim 8, wherein the object comprises a human face.

10. The electronic device of claim 9, wherein the putative structure of the object comprises an affine space of face shapes.

11. The electronic device of claim 8, wherein the instructions to cause the electronic device to obtain first and second images comprise instructions to obtain the first and second images from the memory.

12. The electronic device of claim 8, wherein the instructions to cause the electronic device to determine a first pose comprise instructions to apply the first set of landmark points to a POSIT operation.

13. The electronic device of claim 10, wherein the the instructions to calibrate comprise instructions to apply the estimated structure of the object to a bundle adjust operation to calibrate the first and second image capture units.

14. The electronic device of claim 13, wherein the instructions to cause the electronic device to calibrate further comprise instructions to apply at least one of the first pose and second pose to the bundle adjust operation.

15. A non-transitory program storage device, readable by one or more processors and comprising instructions stored thereon to cause the one or more processors to:
obtain a first image of an object from a first image capture unit and, concurrently, a second image of the object from a second image capture unit;
identify a first set of landmark points based on the first image and a second set of landmark points based on the second image;
determine a first pose of the object based on the first set of landmark points and a putative structure of the object and a second pose of the object based on the second set of landmark points and the putative structure of the object;
determine an estimated structure of the object based on a model of the object and the first and second poses;
determine a projection error based on the first pose, the second pose and the estimated structure of the object;
evaluate whether the projection error meets a threshold value;
calibrate the first and second image capture units based on the estimated structure when the projection error meets the threshold value; and
repeat each of the instructions to determine and the instructions to evaluate when the projection error does not meet the threshold value, wherein the putative structure of the object is replaced by the estimated structure of the object.

16. The non-transitory program storage device of claim 15, wherein the instructions to determine first and second poses based on a putative structure of the object comprise instructions to determine first and second poses based on an affine space of face shapes.

17. The non-transitory program storage device of claim 15, wherein the instructions to cause the one or more processors to determine a first pose comprise instructions to apply the first set of landmark points to a POSIT operation.

18. The non-transitory program storage device of claim 15, wherein the the instructions to calibrate comprise instructions to apply the estimated structure of the object to a bundle adjust operation to calibrate the first and second image capture units.

19. The non-transitory program storage device of claim 18, wherein the instructions to cause the electronic device to calibrate further comprise instructions to apply at least one of the first pose and second pose to the bundle adjust operation.

* * * * *